United States Patent [19]
Codilian et al.

[11] Patent Number: 6,104,153
[45] Date of Patent: Aug. 15, 2000

[54] DISK DRIVE EMPLOYING METHOD OF SPINNING DOWN ITS SPINDLE MOTOR TO REDUCE THE TIME REQUIRED FOR SPINNING IT DOWN AND SUBSEQUENTLY SPINNING IT UP

[75] Inventors: Raffi Codilian, San Dimas; Steven Nemshick, Santa Ana; Robert P. Ryan, Coto de Caza, all of Calif.

[73] Assignee: Western Digital Corporation, Irvine, Calif.

[21] Appl. No.: 09/256,645

[22] Filed: Feb. 23, 1999

[51] Int. Cl.[7] .......................................... H02K 7/10
[52] U.S. Cl. ..................... 318/362; 318/364; 318/138; 318/254; 318/439; 360/73.03; 360/75
[58] Field of Search ..................... 318/362, 364, 318/254, 138, 439; 360/73.03, 75

[56] References Cited

U.S. PATENT DOCUMENTS

| | | |
|---|---|---|
| 5,223,771 | 6/1993 | Chari . |
| 5,397,971 | 3/1995 | McAllister et al. .................... 318/254 |
| 5,397,972 | 3/1995 | Maiocchi . |
| 5,471,353 | 11/1995 | Codilian et al. . |
| 5,530,326 | 6/1996 | Galvin et al. . |
| 5,623,379 | 4/1997 | Nishimura et al. . |
| 5,650,886 | 7/1997 | Codilian et al. . |
| 5,808,440 | 9/1998 | Bennett et al. ......................... 318/778 |
| 5,874,796 | 2/1999 | Petersen ................................. 318/254 |
| 6,034,496 | 3/2000 | Male ....................................... 318/439 |

OTHER PUBLICATIONS

Raffi Codilian, Don Stupeck—"A Multi Mode Spindle Selection Within a Disk Drive System," Incremental Motion Control Systems Symposium, 1995.

Raffi Codilian, Don Stupeck—"An Optimization Method of Spindle Motor and Driver Selection Within a Disk Drive System," Incremental Motion Systems Symposium, 1995.

*Primary Examiner*—Karen Masih
*Attorney, Agent, or Firm*—Milad G. Shara

[57] ABSTRACT

A disk drive employs a method of operating a spindle motor to respond to a spin-down command to reduce the time required for spinning down and subsequently spinning up the spindle motor. The disk drive is connectable to a power supply having a fixed DC voltage. The spindle motor includes a stator having a plurality of windings and a rotor rotatable at a variable spin-rate. The rotor has an angular position relative to the stator. The disk drive includes switching elements coupled to the fixed DC voltage and the plurality of windings. The switching elements are controlled to sequentially apply the fixed DC voltage across a selected combination of the windings to generate a negative torque on the rotor such that a controlled braking operation is performed to decelerate the rotor to a selected spin-rate $\omega 1$. After the variable spin-rate is reduced to the selected spin-rate $\omega 1$, the switching elements are controlled to apply the fixed DC voltage across at least one of the windings such that a controlled rotor-stopping operation is performed to control the angular position of the rotor when the rotor comes to a stop at the end of the controlled rotor-stopping operation.

8 Claims, 9 Drawing Sheets

Fig. 4A
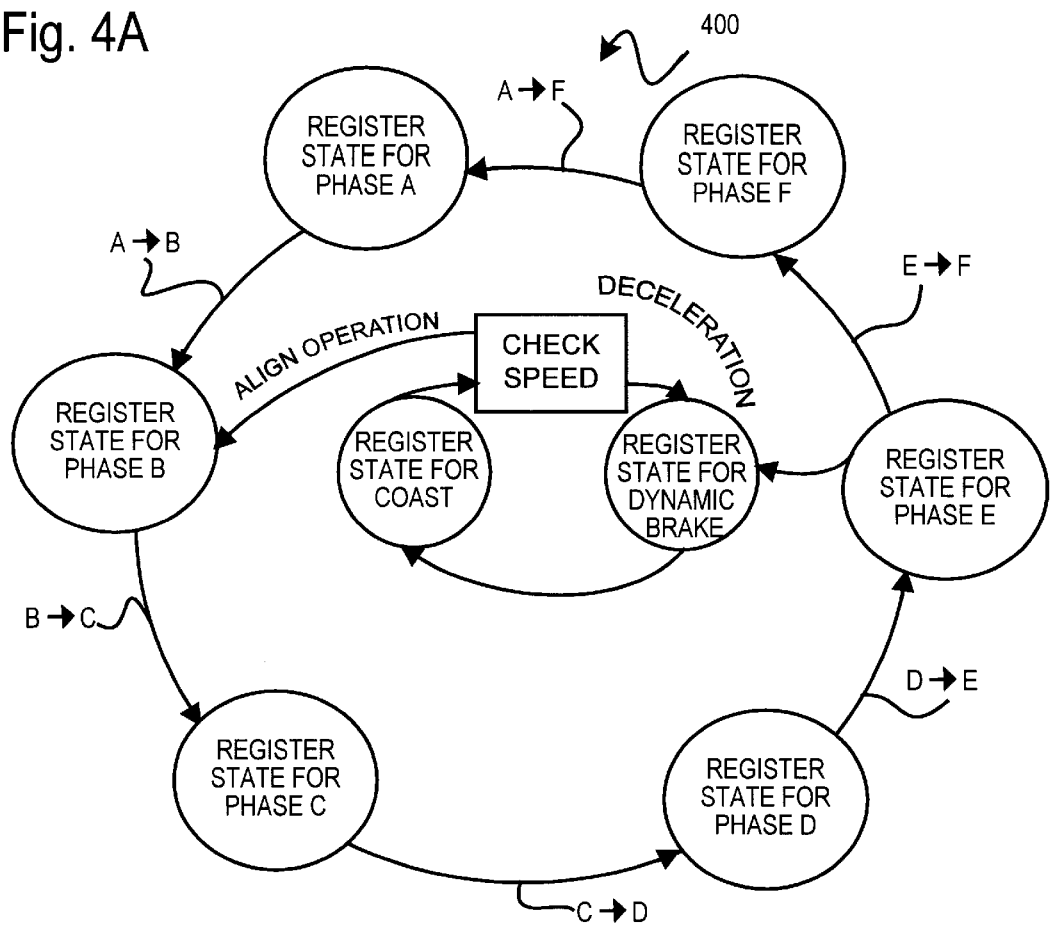
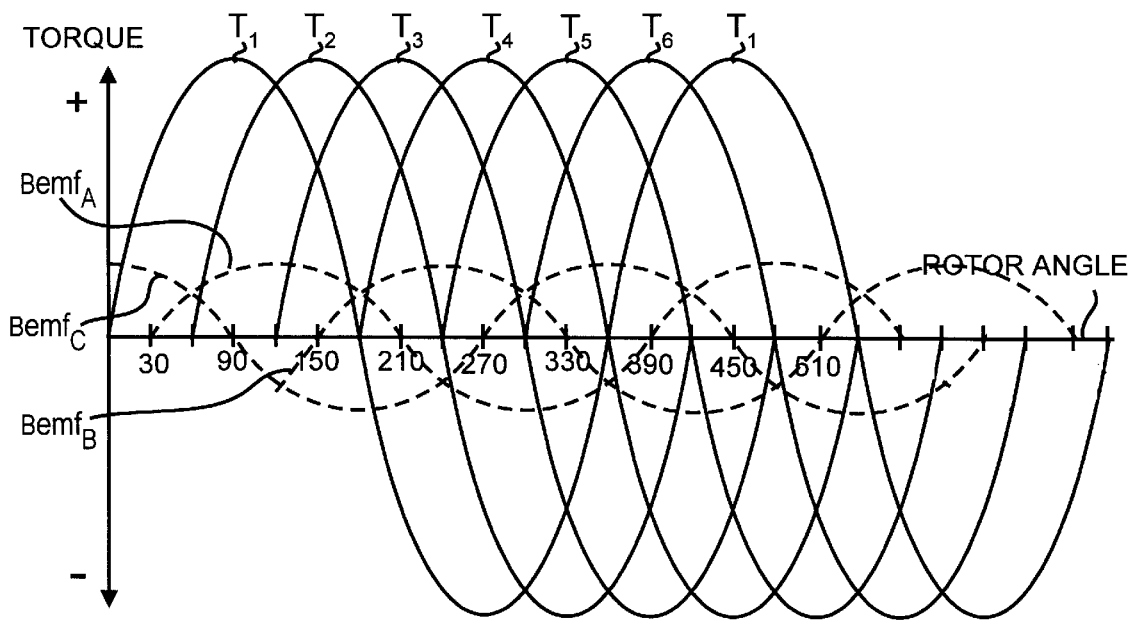
Fig. 4B

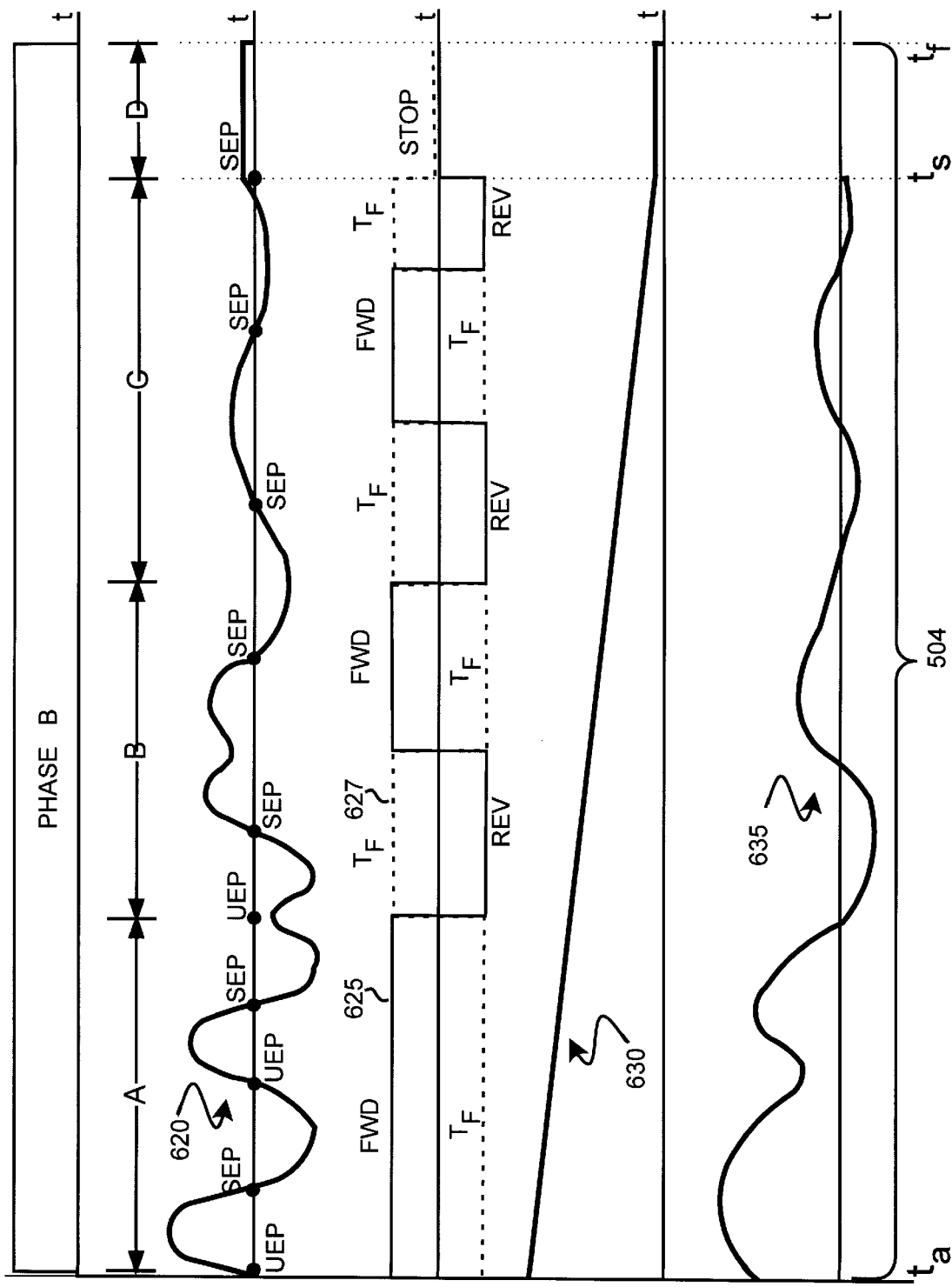

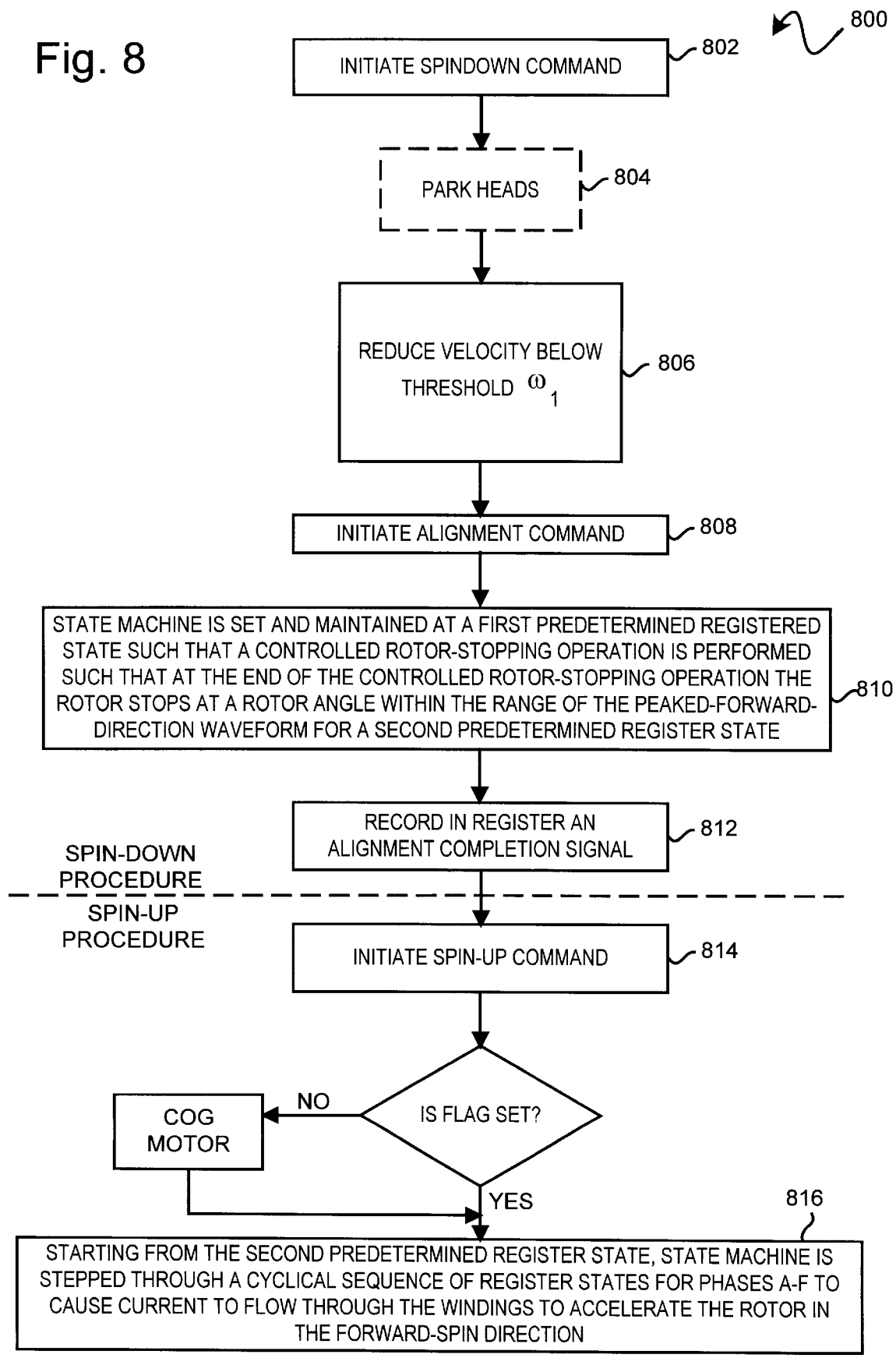

DISK DRIVE EMPLOYING METHOD OF SPINNING DOWN ITS SPINDLE MOTOR TO REDUCE THE TIME REQUIRED FOR SPINNING IT DOWN AND SUBSEQUENTLY SPINNING IT UP

CROSS-REFERENCE TO RELATED PATENT APPLICATION

This patent application relates to commonly assigned patent application Ser. No. 09/120,854 entitled "DISK DRIVE EMPLOYING METHOD OF SPINNING DOWN ITS SPINDLE MOTOR TO REDUCE THE TIME REQUIRED FOR SUBSEQUENTLY SPINNING IT UP" filed on Jul. 21, 1998, which is herein incorporated by reference.

BACKGROUND OF THE INVENTION

1. Field of the Invention

The present invention relates to a disk drive such as a magnetic hard disk drive having a spindle motor with a stator and a rotor that is rotatable about the stator desirably in a forward-spin direction and undesirably in a reverse-spin direction. More particularly, the present invention relates to controlling the angular velocity of the rotor during spin-down and subsequent spin-up procedures.

2. Description of the Prior Art

A huge market exists for hard disk drives for mass-market host computer systems such as servers, desktop computers, and laptop computers. To be competitive in this market, a hard disk drive must be relatively inexpensive, and must accordingly embody a design that is adapted for low-cost mass production. In addition, it must provide substantial capacity, rapid access to data, and reliable performance. Numerous manufacturers compete in this huge market and collectively conduct substantial research and development to design and develop cost effective technologies including structure and methods for rapidly performing spin-down and subsequent spin-up procedures.

Each of numerous disk-drive companies manufacture and sell hard disk drives that have similarities in basic design pursuant to which the disk drive includes a head disk assembly ("HDA") and a printed circuit board assembly ("PCBA") connected to the HDA. The HDA includes at least one disk and a spindle motor. The PCBA includes circuitry for controlling the operation of the spindle motor. The PCBA is connected to an external host system that includes a standard power supply for providing a fixed DC voltage to the spindle motor.

As for the basic construction of the spindle motor, it has stationary elements, collectively referred to as a stator, and it has rotatable elements, collectively referred to as a rotor. The rotor includes a hub that supports each disk. The spindle motor includes a bearing arrangement such as sets of ball bearings or a journal bearing so that the rotor is rotatable about the stator. The stator includes electromechanical stator structure; this structure includes a stator core having a plurality of core members that radiate away from the center of the core to define stator poles, and a set of stator wires that are wound around the stator poles and interconnected in a predetermined configuration such as a "Y" configuration of windings. The rotor includes a set of permanent magnets that are arranged to define rotor poles.

As for the basic operation of the spindle motor in a disk drive, the rotation of the rotor causes each disk to spin. It would be desirable for the rotation always to be in a forward-spin direction; undesirably, the rotor can rotate in a reverse-spin direction. To accelerate the rotor to a normal operating spin rate, and then to maintain the spin rate substantially constant, applied torque must be generated first to overcome stiction and, then to oppose dynamic frictional forces. To generate the applied torque, current is caused to flow through one or more of the windings to generate an electromagnetic field referred to herein as a stator magnetic field. The magnitude of the stator magnetic field is variable; it depends upon the magnitude of current flow. The instantaneous angular direction of the stator magnetic field is also variable. The permanent magnets in the rotor produce a rotor magnetic field. The stator magnetic field and the rotor magnetic field interact. When the two fields are exactly intersect, the force on the rotor is maximized and the applied torque is zero; otherwise, applied torque is generated. The applied torque has a magnitude that varies as a periodic function of the rotor angle.

As for the basic construction of the circuitry for controlling the operation of the spindle motor, it includes switching elements and a state machine for controlling the operation of the switching elements. In a disk drive, the terminals of the stator windings are electrically connected to the output terminals of the switching elements. Typically, the state machine and the switching elements are part of a single integrated circuit chip referred to as a spindle motor driver. The state machine that can be implemented by dedicated circuitry within the spindle motor driver chip, by a programmed microprocessor, or otherwise. The state machine includes a register set and combinatorial logic interconnected with the register set. The register set defines one state at a time out of a plurality of register states. The state machine has an input for receiving a set of digital input signals and has an output for producing a set of output digital signals. At each instant, the values of the set of output digital signals depend upon the present register state and the values of the set of digital input signals. Also, the next register state to which the state machine will step depends upon the present register state and the values of the set of digital input signals. The state machine defines a set of transitions between the states in accordance with a state diagram.

As for the basic circuit operation involving the control of operation of the spindle motor, the circuitry performs a process referred to as "commutation." The commutation process can cause the angular direction of the stator magnetic field to be rotated in a way that causes the rotor to "follow" it. The term "commutation" is used in several senses in this art. As for its dictionary meaning with reference to a DC motor and an external circuit for supplying current to it, the dictionary meaning is "a reversal or transference" between a winding and the external circuit. In this art, the term "commutation" is also used in reference to operating conditions caused by and corresponding to a state defined by the state machine in the external circuitry. When the term commutation is used in the sense of a reversal or transference, it refers to a change caused by a transition in the state diagram. That is, the operating condition of the switching elements change upon each transition in the state diagram; likewise there is a corresponding change in the instantaneous angular direction of the stator magnetic field upon each transition in the state diagram. The term is also used in the phrase "commutation phase" in reference to the operating condition corresponding to a state defined by the state machine.

During an interval of time, the set of output digital signals produced by the state machine can define a predetermined sequence out of a plurality of predetermined sequences.

Such a predetermined sequence can be cyclical. Such a cyclical sequence is referred to herein as a commutation sequence. For example, throughout normal operation while the rotor is spinning at its normal operating spin rate, the state machine steps through a commutation sequence to cause the instantaneous stator magnetic field to rotate in direction consistently with the rotation of the rotor magnetic field.

In a spindle motor driver chip, the switching elements are typically implemented by tristate CMOS switching elements. These switching elements are controlled by the combinatorial logic in accordance with the register state of the state machine. These switching elements are connected to the terminals of the stator windings and switch on and off to control the flow of current through the windings. Three items discussed above can be related on a one-to-one correspondence basis in a truth table; these being: 1) the state of the register set in the state machine; 2) the operating condition of the switching elements; and 3) the instantaneous angular direction of the stator magnetic field.

The terms "unipolar," "bipolar," and "tripolar" are used in this art in reference to modes of operation with respect to current flow through the windings of a three-phase motor. See an article authored by Raffi Codilian and Don Stupeck titled "A MULTI MODE SPINDLE SELECTION WITHIN A DISK DRIVE SYSTEM," published in the Incremental Motion Control Systems Symposium in 1995.

In unipolar mode, current flows through a single winding between one of the winding terminals and the centertap, while no current flows through either of the other windings. In bipolar mode, current flows through two of the windings between two of the winding terminals, while no current flows through the other winding. In tripolar mode, current flows through all three of the windings.

With reference to the graphs shown in FIGS. 1A, 1B, and 1C, in each case, the abscissa represents the rotor angle (the angular position in electrical degrees relative to the stator), and the ordinate represents applied torque on the rotor resulting from the interaction of (1) the stationary magnetic field produced electromagnetically for the present stator condition pursuant to the register state corresponding to the depicted torque curve, and (2) the rotating magnetic field produced by the permanent magnets in the rotor. For each register state of the state machine, there are two rotor angles where the two fields exactly intersect. One of these is called a stable equilibrium position and the other is called an unstable equilibrium position.

In FIG. 1A, a representative torque curve T1 has an unstable equilibrium position (UEP) at the origin (0 electrical degrees), a stable equilibrium position (SEP) at 180 electrical degrees, and an unstable equilibrium position (UEP) at 360 electrical degrees. The torque curve T1 defines a peaked forward-direction waveform (PFW) throughout the angular interval between 0 and 180 electrical degrees. Any rotor angle in the range between 0 and 180 electrical degrees can be said to be "within the range of the peaked forward-direction waveform" for register state corresponding to the torque curve T1. The torque curve T1 defines a peaked reverse-direction waveform (PRW) throughout the angular interval between 180 electrical degrees and 360 electrical degrees.

Consider a circumstance in which the rotor is stationary and positioned at the stable equilibrium position (SEP) at 180 electrical degrees. If the rotor were to be disturbed for any reason such that it rotates in the forward-spin direction, the applied torque on the rotor would change from zero to a negative value that would urge the rotor to return to the stable equilibrium position (SEP) at 180 electrical degrees. Similarly, if the rotor were to be disturbed for any reason such that it moves in the reverse-spin direction, the applied torque on the rotor would change from zero to a positive value that would urge the rotor to return to the stable equilibrium position (SEP) at 180 electrical degrees.

Consider a circumstance in which the rotor is stationary and positioned at the unstable equilibrium UEP at 0 electrical degrees. If the rotor were to be disturbed for any reason such that it rotates in the forward-spin direction, the applied torque on the rotor would change from zero to a positive value that would urge the rotor to continue rotating in the forward-spin direction. Similarly, if the rotor were to be disturbed for any reason such that it rotates in the reverse-spin direction, the applied torque on the rotor would change from zero to a negative value that would urge the rotor to continue rotating in the reverse-spin direction.

In FIG. 1B, a representative torque curve T4 has a stable equilibrium position (SEP) at the origin, an unstable equilibrium position (UEP) at 180 electrical degrees, and a stable equilibrium position (SEP) at 360 electrical degrees. The torque curve T4 defines a peaked reverse-direction waveform (PRW) throughout the angular interval between the origin and 180 electrical degrees. The torque curve T4 defines a peaked forward-direction waveform (PFW) throughout the angular interval between 180 electrical degrees and 360 electrical degrees.

The torque curves of FIGS. 1A and 1B differ in phase by 180°. Although the same windings have the same magnitude of current flowing for the torque curves of FIGS. 1A and. 1B, the current directions are opposite.

In FIG. 1C. six separate torque curves (T1) through (T6) are superimposed on the same graph.

Consider now the question of how to start to start to perform a spin-up procedure to cause the rotor of the spindle motor to accelerate to its normal operating spin rate from the position at which it last stopped. The switching elements are controlled to apply the DC voltage from the power supply across the windings of the spindle motor to generate a positive torque on the rotor to accelerate it to an operating spin-rate.

Consider a circumstance in which, at the time a spin-up command is received, the rotor angle is at 270 electrical degrees (the starting rotor angle). If the spin-up procedure were to start with torque curve T4, desirable results would follow in that the applied torque would be in the forward-spin direction. In this case, the starting rotor angle is within the range of the peaked forward-direction waveform for torque curve T4. On the other hand, if the spin-up procedure were to start with torque curve T1, undesirable results would follow in that the applied torque would be in the reverse-spin direction. In this case, the starting rotor angle is outside the range of the peaked forward-direction waveform for torque curve T1.

An abundance of tutorial material exists about disk drive technology relevant to the construction and operation of spindle motors including spin-down and subsequent spin-up procedures. Reference is made to the following representative patents:

U.S. Pat. No. 5,397,972, titled "START-UP PROCEDURE FOR A BRUSHLESS, SENSORLESS MOTOR" (the '972 patent);

U.S. Pat. No. 5,530,326 titled "BRUSHLESS DC SPINDLE MOTOR STARTUP CONTROL" (the '326 patent);

U.S. Pat. No. 5,623,379 titled "METHOD OF CONTROLLING A START-UP OF A MOTOR USED FOR A DISK APPARATUS" (the '379 patent);

U.S. Pat. No. 5,471,353 titled "DISK DRIVE EMPLOYING MULTI-MODE SPINDLE DRIVE SYSTEM" (the '353 patent);

U.S. Pat. No. 5,650,886 titled "DISK DRIVE SPINDLE MOTOR STARTUP USING AN ADDITIONAL MOTOR WINDING UPON STARTUP FAILURE;" and U.S. Pat. No. 5,223,771 titled "POLYPHASE BRUSHLESS DC MOTOR CONTROL" (the '771 patent).

The '972 patent shows torque curves in accordance with a presentation convention in which forward-spin direction extends from right to left, whereas FIGS. 1A through 1C show torque curves in accordance with a different presentation convention in which forward-spin direction extends from left to right. There is no substantive difference between these drawings. The '972 patent is directed to an approach intended to provide a fast start-up procedure which will prevent backward rotation irrespective of the starting angular position of the rotor.

The '326 patent is directed to an approach intended to detect starting rotor angular position.

The '379 patent is directed to an approach involving spindown to a stop, followed by a procedure normally used as part of response to a spin-up command, followed by an indefinite time period, followed by a spin-up procedure.

The '771 patent shows in its FIG. 4 a flow chart of actions typically taken during a spin-up procedure. One action is referred to as "COG MOTOR" and is described in the text as moving "the rotor of the motor to a specific phase position." This action takes time and it is desirable to reduce the amount of time taken to carry out a spin-up procedure.

FIG. 1D hereof presents a timing diagram relating to the overall time for effecting a spin-up procedure according to the prior art taught in the '771 patent. One part of the overall time is an interval 110 during which the COG MOTOR action takes place. Next is an interval 112 during which a blind spin action takes place. Next is an interval 114 during which Back ElectroMotiveForce ("BEMF") sensing is employed in a servo process for controlling the acceleration of the rotor up to the desired operating spin rate. There is a need for an improved method of controlling the spinning down and subsequent spinning up of the spindle motor in a disk drive. Preferably, the improved method reduces the time required for spinning down and spinning up the spindle motor, and reduces head/disk wear of the kind that results from head and disk contact disk during the spin-down procedure and spinning the disk in the reverse-spin direction while the head is bearing against the disk during the spin-up procedure.

SUMMARY OF THE INVENTION

The invention can be regarded as a method of operating a spindle motor in a disk drive connectable to a power supply having a fixed DC voltage. The spindle motor includes a stator having a plurality of windings and a rotor rotatable at a variable spin-rate. The rotor has an angular position relative to the stator. The disk drive includes switching elements coupled to the fixed DC voltage and the plurality of windings. The method includes controlling the switching elements to sequentially apply the fixed DC voltage across a selected combination of the windings to generate a negative torque on the rotor such that a controlled braking operation is performed to decelerate the rotor to a selected spin-rate $\omega 1$. The method further includes controlling the switching elements to apply the fixed DC voltage across at least one of the windings after the variable spin-rate is reduced to the selected spin-rate $\omega 1$ such that a controlled rotor-stopping operation is performed to control the angular position of the rotor when the rotor comes to a stop at the end of the controlled rotor-stopping operation.

The invention can also be regarded as a method of operating a spindle motor in a disk drive connectable to a power supply having a fixed DC voltage. The spindle motor includes a stator having a plurality of windings and a rotor rotatable at a variable spin-rate in a forward-spin direction. The rotor has an angular position relative to the stator. The disk drive includes switching elements coupled to the fixed DC voltage and the plurality of windings. The method includes sending a spin-down command while the rotor is spinning at the variable spin-rate in the forward spin-direction. After receiving the spin-down command, and while the rotor continues to spin in the forward spin-direction, the method includes controlling the switching elements to sequentially apply the fixed DC voltage across a selected combination of the windings to generate a negative torque on the rotor such that a controlled braking operation is performed to decelerate the rotor to a selected spin-rate $\omega 1$. After the variable spin-rate is reduced to the selected spin-rate $\omega 1$, the method includes controlling the switching elements to apply the fixed DC voltage across at least one of the windings such that a controlled rotor-stopping operation is performed to control the angular position of the rotor relative to the stator when the rotor comes to a stop at the end of the controlled rotor-stopping operation. The method further includes sending a spin-up command after performing the controlled rotor-stopping operation. After receiving the spin-up command, the method includes controlling the switching elements to sequentially apply the fixed DC voltage across a selected combination of the windings to generate a positive torque on the rotor to accelerate the rotor to an operating spin-rate.

The invention can also be regarded as a method of operating a spindle motor in a disk drive. The spindle motor includes a stator and a rotor that defines a rotor angle and that is rotatable about the stator desirably in a forward-spin direction and undesirably in a reverse-spin direction. The rotor produces a rotor magnetic field that varies in angular direction as a function of the rotor angle. The stator includes a plurality of windings. The drive includes a state machine and driver circuitry. The state machine is settable to any one of a plurality of register states including a first predetermined register state and a second predetermined register state. The driver circuitry is controlled by the state machine to cause current to flow selectively through the windings to generate a stator magnetic field. While the state machine is set in the first predetermined register state, the stator magnetic field has a first angular direction. While the state machine is set in the second predetermined register state, the stator magnetic field has a second angular direction.

This stator magnetic field interacts with the rotor magnetic field to generate applied torque to act on the rotor. This applied torque has a magnitude that varies as a periodic function of the rotor angle. For each register state, this periodic function repeatedly defines in sequence a peaked reverse-direction waveform, a stable equilibrium position, a peaked forward-direction waveform, and an unstable equilibrium position. The method comprises the step of sending a spin-down command while the rotor is spinning in the forward-spin direction. After receiving the spin-down command, and while the rotor continues to spin in the forward-spin direction, the method includes stepping the state machine through a commutation sequence of register states to cause current to flow through the windings such that a controlled braking operation is performed to decelerate the rotor to a spin-rate ω1. The method further includes setting the state machine to the first predetermined register state and maintaining the state machine in the first predetermined register state such that a controlled rotor-stopping operation is performed such that at the end of the controlled rotor-stopping operation the rotor stops at a rotor angle within the range of the peaked forward-direction waveform for the second predetermined register state;

The method preferably includes setting a flag in a register to indicate successful completion of the controlled rotor-stopping operation. Preferably, when a spin-up command is sent, the register is checked for the flag. If the flag is set, the state machine steps through a sequence of register states to cause current to flow through the windings to accelerate the rotor to rotate in the forward-spin direction. This sequence can be, and preferably is, started by setting the state machine to the second predetermined register state.

The invention can also be regarded as a disk drive comprising the above-mentioned spindle motor, state machine and driver circuitry. The disk drive further includes means for sending a spin-down command while the rotor is spinning in the forward-spin direction. The disk drive includes means operative after receiving the spin-down command, and while the rotor continues to spin in the forward-spin direction, for stepping the state machine through a commutation sequence of register states to cause current to flow through the windings such that a controlled rotor stopping operation is performed to decelerate the rotor to a selected spin-rate ω1. The disk drive further includes means operative after decelerating the rotor to the selected spin-rate ω1 for setting the state machine to the first predetermined register state and maintaining the state machine in the first predetermined register state such that a controlled rotor-stopping operation is performed such that at the end of the controlled rotor-stopping operation the rotor stops at a rotor angle within the range of the peaked forward-direction waveform for the second predetermined register state. The disk drive includes means for sending a spin-up command after performing the controlled rotor-stopping operation. The disk drive further includes means operative after receiving the spin-up command for stepping the state machine through a commutation sequence of register states to cause current to flow through the windings to accelerate the rotor to rotate in the forward-spin direction.

BRIEF DESCRIPTION OF THE DRAWINGS

FIG. 4A is a state diagram for the register-state sequencer of FIG. 2B.

FIG. 4B shows a superimposed set of torque curves, each torque curve corresponding to a respective one of the register states in the state diagram of FIG. 4A.

FIGS. 6A, 6B, 6C and 6D are all diagrams having a common abscissa representing time during the controlled rotor-stopping operation; FIG. 6A shows a commutation clock signal for selecting and maintaining a single register state during the controlled rotor-stopping operation; FIG. 6B shows applied torque on the rotor while a single register state is maintained during the controlled rotor-stopping operation; FIG. 6C is a spin-direction/frictional torque diagram showing the spin-direction of the rotor and corresponding frictional torque $T_f$ opposing the spin-direction during the controlled rotor-stopping operation; FIG. 6D shows an energy curve concerning the total energy in the spindle motor during the controlled rotor-stopping operation; FIG. 6E shows a velocity curve concerning deceleration of the rotor during the controlled-rotor stopping operation.

FIG. 8 is a flow chart for operating the spindle motor in the disk drive of FIG. 2.

DESCRIPTION OF THE PREFERRED EMBODIMENTS

Figure 2A:
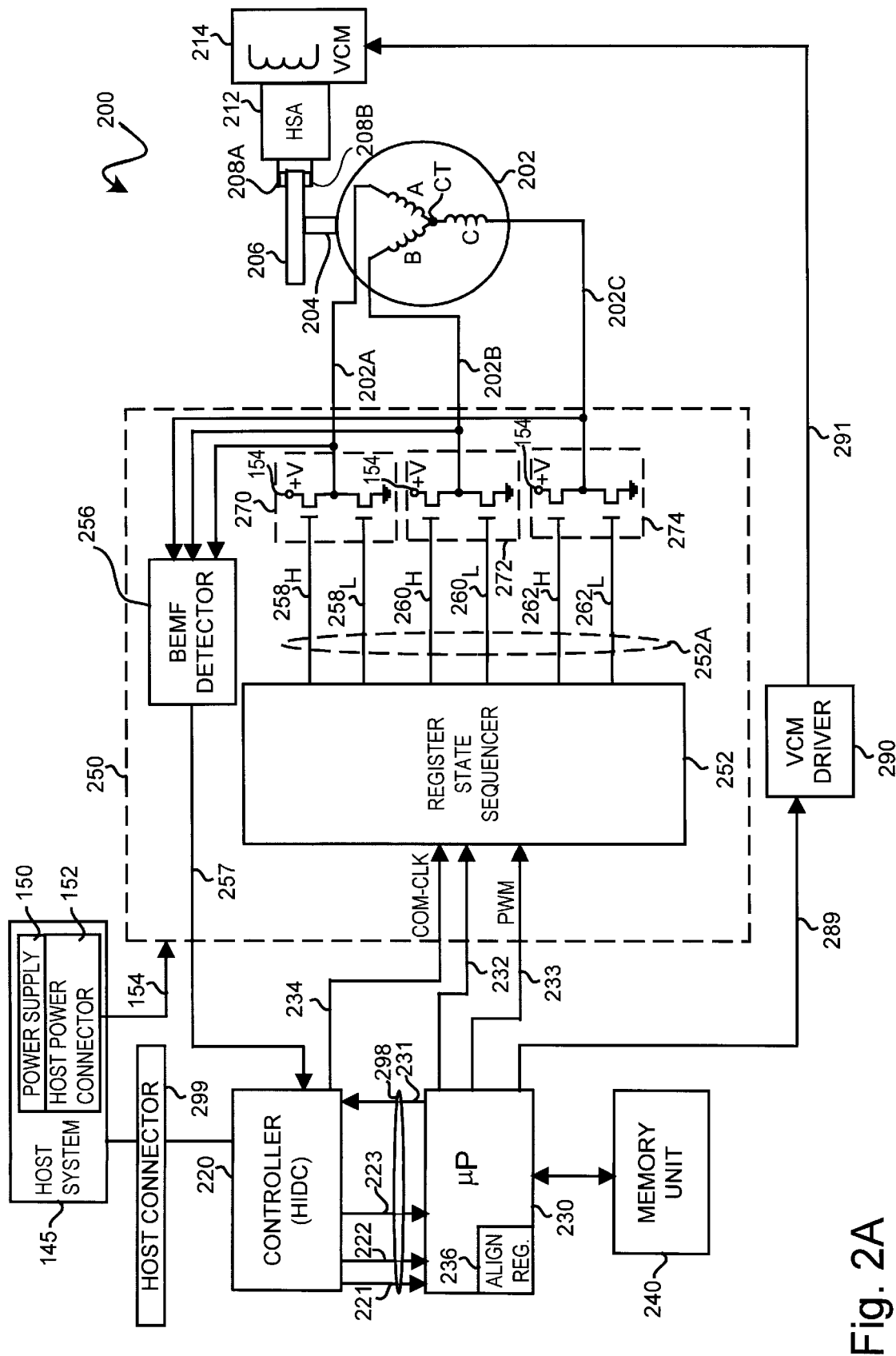
FIG. 2A is a block diagram of a disk drive embodying the invention.

Referring to FIG. 2A, a disk drive 200 embodying the invention comprises an HDA and a PCBA. The HDA includes a spindle motor 202 having a stator comprising windings A, B, and C. The spindle motor 200 has a rotor 204 that is rotatable about the stator desirably in a forward-spin direction and undesirably in a reverse-spin direction. The HDA includes a disk 206 supported by the rotor 204. The HDA includes a head stack assembly ("HSA") 212, and structure that cooperates with the HSA 212 to define a voice coil motor ("VCM 214"). The HSA 212 includes transducers 208A and 208B for writing and reading data to and from the recording surfaces of the disk 206.

The PCBA includes circuitry that functionally defines a host interface and disk controller ("controller 220"), a microprocessor 230, a memory unit 240, a spindle motor driver 250, a voice coil motor driver ("VCM driver 290"), and a host connector 299 for connecting the controller220 to an external host 145. Host 145 includes a standard power supply 150 which supplies a fixed DC voltage to the PCBA via power supply connector 152.

Memory unit 240 includes control routines (instructions) for controlling the overall operation of the spindle motor 202.

Suitably, the PCBA includes a parallel bus 298 and a serial bus for interconnecting the microprocessor 230 and other IC chips on the PCBA.

Suitably, microprocessor 230 includes a register 236 for storing a flag indicating whether a controlled rotor-stopping operation has been successfully completed. Alternatively, the flag can be stored in a register defined by a memory location in the memory unit 240.

The spindle motor driver 250 includes a register-state sequencer 252, a BEMF detector 256, and switching elements 270, 272, and 274.

Suitably, the controller 220 communicates with the BEMF detector 256 by receiving a zero crossing signal 257. The zero crossing signal 257 is a timing signal that identifies the instant at which a zero crossing occurs in the BEMF induced in a floating winding as a result of the floating winding acting like an AC voltage generator. Suitably, the controller 220 communicates with the register-state sequencer 252 by sending a COM-CLK signal 234. Suitably, the controller 220 communicates with the microprocessor 230 via the parallel bus 298 by sending a spin-down command 221, a zero crossing information signal 222, and a spin-up command 223, and by receiving a commutation command 231.

Suitably, the microprocessor 230 communicates with the register-state sequencer 252 by sending a serial interface command 232 and a PWM control signal 233. PWM control signal 233 represents a duty cycle for applying the power supply voltage (+V) across the windings of the spindle motor.

Figure 2B:
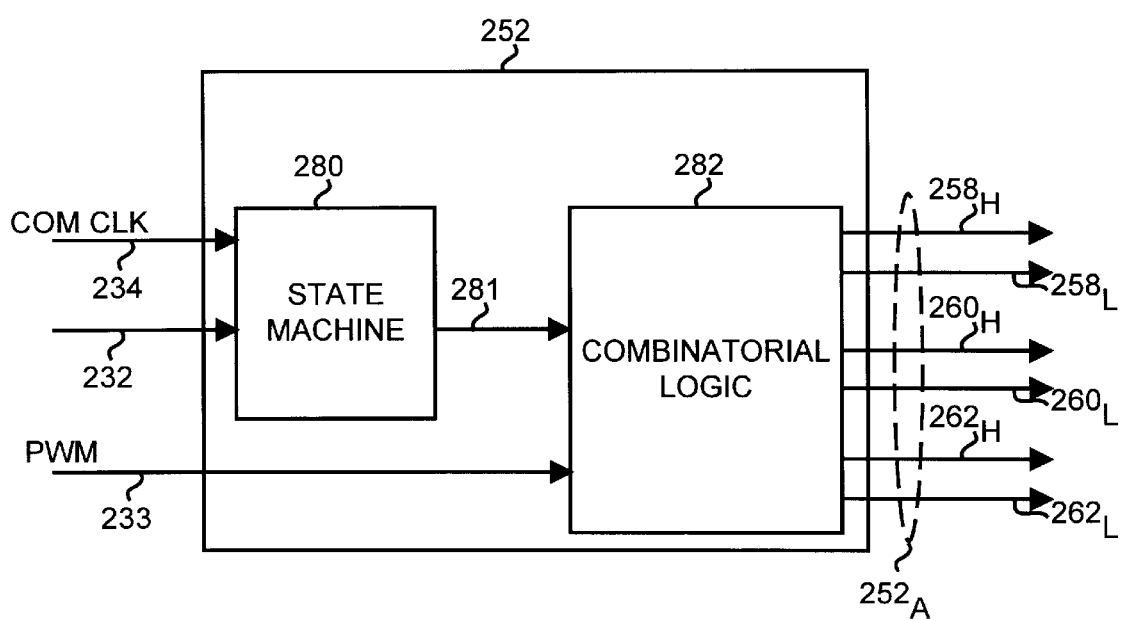
FIG. 2B is a block diagram of a register-state sequencer in the spindle motor driver of FIG. 2A.

Referring to FIG. 2B, the register-state sequencer 252 includes a state machine 280 and combinatorial logic 282. The state machine 280 receives the serial interface command 232, the PWM control signal 233, and the commutation clock signal 234.

The state machine 280 provides a register state signal 281 to combinatorial logic 282. The combinatorial logic 282 also receives the PWM control signal 233. The combinatorial logic 282 provides six output signals collectively identified as 252A in FIG. 2B. These are: 258H, 258L, 260H, 260L, 262H, and 262L.

Figure 3:
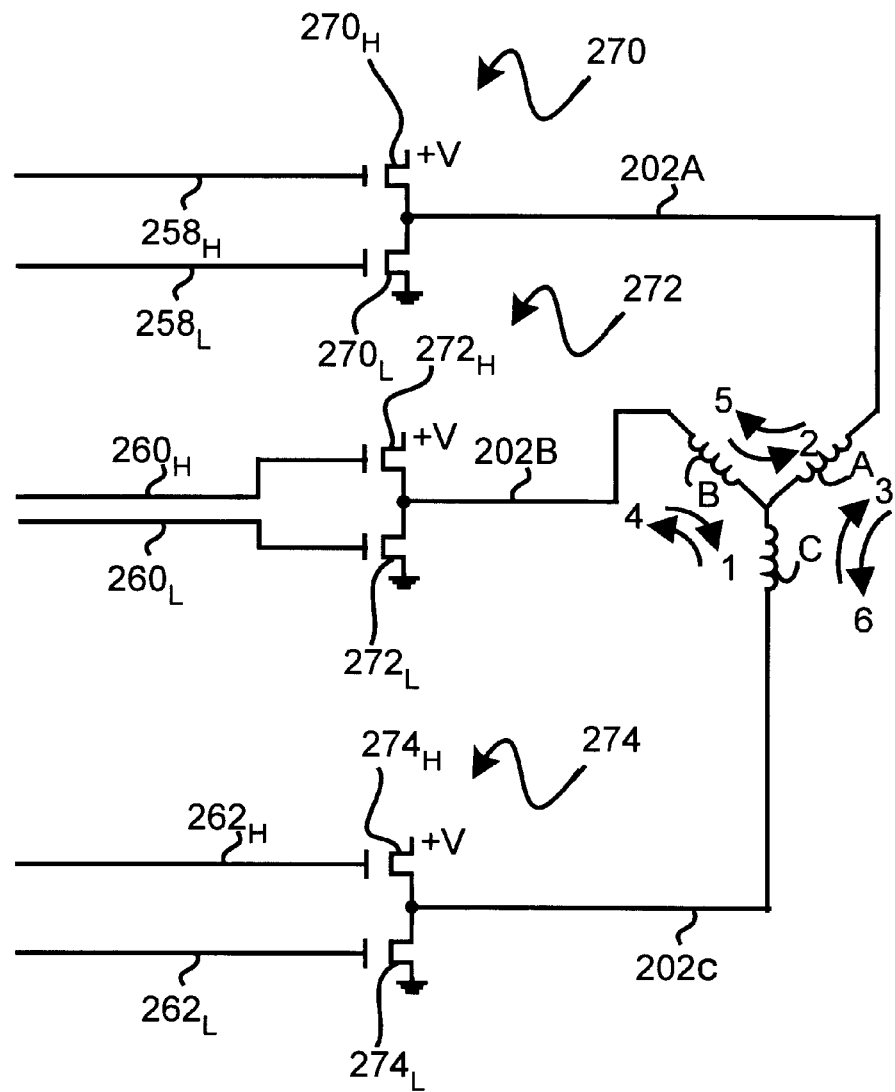
FIG. 3 is a schematic diagram showing switching elements in the spindle motor driver of FIG. 2A connected to terminals of the windings A, B, C.

With reference to FIG. 3, the stator windings A, B, and C are electrically arranged in a Y configuration and have a center tap CT. Winding A has a terminal 202A. Winding B has a terminal 202B. Winding C has a terminal 202C. Spindle motor driver 250 includes switching elements 270, 272, and 274. Switching element 270 is connected to terminal 202A of winding A. Switching element 272 is connected to terminal 202B of winding B. Switching element 274 is connected to terminal 202C of winding C.

Switching element 270 includes an upper transistor $270_H$ having its source connected to a positive voltage, and a lower transistor $270_L$ having its drain connected to ground. Switching element 272 includes an upper transistor $272_H$ having its source connected to a positive voltage, and a lower transistor $272_L$ connected ground. Switching element 274 includes an upper transistor $274_H$ having its source connected to a positive voltage, and its lower transistor $274_L$ connected to ground.

Suitably, current flows through the windings of spindle motor 202 in bipolar mode whereby switching elements 270, 272, and 274 are controlled to cause current to flow through two of the windings A, B, C. Alternatively, tripolar mode can be used whereby switching elements 270, 272, and 274 are controlled to cause current to flow through all the windings A, B, C. Alternatively, unipolar mode can be used, whereby switching elements are controlled to cause current to flow through the centertap and one at a time of the windings A, B, C. According to another embodiment, current flows through the windings of spindle motor 202 in a hybrid bipolar/tripolar mode.

Switching elements 270, 272, and 274 are controlled to cause current to flow in one of six possible current directions 1–6 through windings A, B, C in the bipolar mode.

Referring to FIG. 4A, a state diagram 400 shows a set of eight register states; these are: six register states for phase A through phase F, a register state for "dynamic" brake, and a register state for coast. Six of the transitions in the state diagram A⑩B, B⑩C, C⑩D, D⑩E, E⑩F, and F⑩A connect six of the states in a circle and indicate a cyclical sequence through which the state machine repeatedly steps throughout various intervals of time.

Table 1 is a truth table showing the correspondence between each of the set of eight register states and the conditions of switching elements 270, 272, and 274 (whether H, L, or X).

TABLE 1

| State | Current direction | Switching elements 270 | 272 | 274 |
| --- | --- | --- | --- | --- |
| For Phase A | B-C (1) | X | H | L |
| For Phase B | B-A (2) | L | H | X |
| For Phase C | C-A (3) | L | X | H |
| For Phase D | C-B (4) | X | L | H |
| For Phase E | A-B (5) | H | L | X |
| For Phase F | A-C (6) | H | X | L |
| For Dynamic Brake (short windings A, B,C) | A, B, C to ground | L | L | L |
| For Coast (float windings A, B, C) | n/a | X | X | X |

The condition H indicates that the upper transistor in a switching element (270, 272, or 274) is conducting to provide a +V voltage to the terminal of the winding (A, B, or C) connected to the switching element. The condition L indicates that the lower transistor in a switching element (270, 272, or 274) is conducting, and thereby grounds the terminal of the winding (A, B, or C) that is connected to the switching element. If either transistor in a switching element (270, 272, or 274) is conducting, the switching element is a "driven switching element." The winding (A, B, or C) connected to the driven switching element is a "driven winding" or "energized winding."

The condition X (tristate condition) indicates that neither the upper nor the lower transistor of a switching element (270, 272, or 274) is conducting, wherein the terminal of the winding (A, B, or C) connected to the switching element "floats" and no current flows through that winding. If neither transistor in a switching element (270, 272, or 274) is conducting, the switching element is a "tristated switching element" (or "undriven switching element"). The winding (A, B, or C) connected to the tristated switching element is a "floating winding."

Register states for Phases A–F define the conditions (H, L, or X) for controlling switching elements 270, 272, and 274 to cause current to flow in one of the six possible current directions 1–6 through windings A, B, C for the bipolar mode. The register state for Dynamic Brake defines the condition (L, L, L) for controlling switching elements to short the windings and cause current to flow from the windings A, B, C to ground to decelerate rotor 204. The register state for Coast defines the condition (X, X, X) for controlling switching elements 270, 272, and 274 to "float" the windings A, B, C so that no current flows through the windings. When floating windings A, B, C, rotor 204 coasts—i.e., rotor 204 continues to rotate subject to deceleration from frictional forces.

The magnitude of the applied torque acting on the rotor while maintaining each register state is a function of the magnitude and direction of current flowing through the windings A, B, C, and the angular position of the rotor relative to the stator.

The peak torque generated can be determined from the torque equation $T_{peak}=K_t I_{coil}$. The variable $K_t$ is a torque constant for the design of spindle motor 202, and the variable $I_{coil}$ is the magnitude of current flowing through the windings A, B, C. The variable $I_{coil}$ can be characterized by the equation $$\frac{V^+}{R_{coil}} - \frac{Vbemf}{R_{coil}},$$

in which $V^+$ is the voltage applied to the terminals of the windings A, B, C. Vbemf is the voltage associated with the back electromotive force induced in the windings A, B, C by the rotating permanent magnet of the rotor. $R_{coil}$ is the resistance of windings A, B, C. Vbemf is equal to $Ke*\omega$, where Ke is the voltage constant of spindle motor 202 (i.e. the Bemf factor) and $\omega$ is the rotational velocity of rotor 204. The peak magnitude of the Vbemf in the windings is proportional to the velocity of rotor 204. As the velocity of rotor 204 increases, the peak magnitude of the Vbemf in the windings A, B, C increases.

Referring to FIG. 4B, a set of torque curves T1–T6 correspond to register states for Phases A–F and a set of BEMF curves bemfA–bemfC correspond to BEMF induced in windings A,B,C by the permanent magnets of rotor 204. Each torque curve is periodic and substantially sinusoidal in shape. Each BEMF curve has a "bemf zero crossing point."

The bemf zero crossing point for an undriven winding can be used for (1) optimizing commutation through the register states for Phases A–F and (2) determining the spin-rate of the rotor 204. For example, while rotor 204 is rotating, bemf detector 256 detects the bemf zero crossing point for an undriven winding to generate zero crossing signal 257. By counting clock pulses or by like processes, the amount of time elapsing between consecutive detected zero crossings can be determined and used for computing the velocity of the rotor 204. Controller 220 receives zero crossing signal 257 and provides the zero crossing information signal 222 to microprocessor 230. Microprocessor 230 receives the zero crossing information signal 222 and computes the velocity of rotor 204. Alternatively, microprocessor 230 receives zero crossing signal 257 from bemf detector 256 and computes the velocity of rotor 204.

To accelerate rotor 204 in a forward-spin direction during the spin-up mode of operation, transitions are made in a cyclical sequence to step through the register states for Phases A–F and to the register state for Phase A again to cause current to flow through the windings to generate a substantially continuous positive torque on the rotor. With reference again to FIG. 4A, the rotor spins at the desired spin rate because a sufficient positive torque is continuously applied to the rotor to oppose frictional torques. The continuously applied positive torque acts on the rotor because the state machine 280 (FIG. 2B) is sequentially set in a cycle through states identified in FIG. 4A as register state for Phase A through F, and back to A again. With reference to FIG. 4B this stepping cyclically through these register states causes applied torque on the motor to define a continuously positive torque with a ripple component whereby the torque curve T1 is active until ideally the magnitude of its torque is less than the magnitude of the torque curve T2 at which time switching occurs between register states, and so forth through the cycle of register states.

Upon microprocessor 230 receiving a spin-down command, microprocessor 230 retrieves and executes the spin-down instructions stored in memory unit 240. For example, controller 220 receives a command from the host computer to generate the spin-down command 221 to initiate performance of a spin-down procedure while the rotor 204 is spinning in the forward-spin direction at normal operating spin rate. Alternatively, controller 220 generates spin-down command 221 while rotor 204 is spinning at a velocity less than the operating velocity. Microprocessor 230 receives spin-down command 221 from controller 220 and then executes the spin-down instructions retrieved from memory unit 240. Alternatively, microprocessor 230 generates the spin-down command and then executes the spin-down instructions retrieved from memory unit 240.

Microprocessor 230 provides VCM control signal 289 to VCM driver 290. VCM driver 290 receives VCM control signal 289 and provides a VCM control signal 291 to voice coil motor 214 for positioning transducers 208A and 208B in a parking zone on disk 206. Alternatively, transducers 208A and 208B are loaded on a ramp to remove transducers 208A and 208B from disk 206. Suitably, microprocessor 230 waits for a time period which is sufficient to complete parking transducers 208A and 208B before proceeding to the spin-down operation. To decelerate rotor 204 during the spin-down mode of operation, it is preferable to decelerate rapidly for awhile.

Preferably, the spin-rate is reduced to a velocity below a predetermined threshold velocity $\omega 1$. The threshold velocity $\omega 1$ is selected such that BEMF in the windings A, B, C can be reliably used for detecting zero crossings of the BEMF to (1) compute the velocity of rotor 204, and (2) optimize the time for selecting and maintaining a register state during the deceleration/alignment period (the controlled rotor stopping operation) of the spin-down mode of operation.

According to a distinguishing feature, the spin-down procedure concludes with the controlled rotor stopping operation. At the beginning of the controlled rotor stopping operation, a register in the state machine is set to and maintained in a first predetermined one of the register states for Phases A–F such that at the end of the controlled rotor-stopping operation, the rotor stops at a rotor angle within the range of the peaked forward-direction waveform for the second predetermined register state.

A controlled braking operation is preferably employed to sequence through the register states for Phases A–F to generate a negative torque to decelerate rotor 204 to a velocity below the threshold velocity $\omega 1$. The controlled braking operation includes controlling switching elements 270, 272, and 274 to sequentially apply the fixed DC voltage (+V) across a selected combination of the windings A,B,C to generate the negative torque on rotor 204. The controlled braking operation involves microprocessor 230 providing spin-down commutation command 231 via parallel bus 298 to controller 220 and PWM control signal 233 to combinatorial logic 282. As discussed above, PWM control signal 233 represents the duty cycle for applying the fixed DC voltage (+V) across the windings A,B,C. To generate a substantially constant negative torque on rotor 204, a substantially constant current is caused to flow through the windings A,B,C. Because the BEMF in the windings decreases as the spin rate decreases during the controlled braking operation, the duty cycle for applying the power supply voltage (+V) across the windings increases to maintain a substantially constant current flow through the windings A,B,C.

During the controlled braking operation, bemf detector 256 monitors Vbemf induced in windings A,B, C and provides zero crossing signal 257 to controller 220. Zero crossing signal 257 provides timing information obtained from BEMF in the undriven winding for controlling commutation clock 234 to optimize the commutation sequence in state machine 280 for advancing from the present register state to the next register. The present state and the next register state are selected such that a negative torque is applied on the rotor 204.

Controller 220 produces commutation clock signal 234 in response to commutation command 231 and zero crossing signal 257 to advance state machine 280 from the present register state to the next register state. For example, after controller 220 receives zero crossing signal 257 indicating a zero crossing point in an undriven winding, controller 220 generates commutation clock 234 to advance state machine 280 to the next register state. Preferably, controller 220 waits a delay period D1 before commutation clock 234 advances state machine 280 to the next register state. The delay period D1 is selected to optimize the negative torque applied on the rotor 204. Suitably, the delay period D1 is used for controlling the transition of state machine 280 through the register states for Phases A–Phases F. State machine 280 receives commutation clock signal 234 from controller 220 to advance to the next register state and generates state signal 281 representing the selected (present) register state. Combinatorial logic 282 receives state signal 281 to generate switch control signals 252A in accordance with the conditions set forth in Table 1. Combinatorial logic 282 also receives PWM signal 233 for controlling the duty cycle for applying the power supply voltage (V+) across the windings A,B,C.

Alternatively, the dynamic braking/coasting operation is employed to decelerate rotor 204 to a velocity below the threshold velocity $\omega 1$. To perform the dynamic braking/coasting operation, a conditional loop is followed in which the register state for Dynamic Brake is selected temporarily to short the windings and in which the register state for Coast is selected temporarily to float the windings. While the windings are floating, the rotor velocity can be checked to determine whether it has been reduced to below the threshold velocity $\omega 1$. Selecting the register state for Dynamic Brake causes current to flow through windings A, B, C to generate a decaying negative torque on the rotor. Selecting the register state for Coast causes rotor 204 to coast. Frictional forces in disk drive 202 contribute to decelerating rotor 204.

Referring to FIG. 4A, the dynamic braking/coasting operation starts when a transition is made from an arbitrary one of the register states, for example, register state E. This transition changes the state of state machine 280 to its dynamic brake state. Microprocessor 230 provides a deceleration command via a serial interface command 232 to set a register in state machine 280 to initiate reducing the velocity of the rotor 204. The deceleration command initiates a phase of operation involving alternate dynamic braking and coasting. During this phase, the dynamic brake state is temporarily set to cause shorting of the windings A, B, C to "dynamically brake" the rotor for a brake period P1 and the coast state is temporarily set to float the windings A, B, C to coast rotor 204 for a coast period P2, until the velocity of the rotor is below a threshold velocity $\omega 1$. FIG. 4A illustrates the above-described cycle of coast state and dynamic brake state by showing a transition from the dynamic brake state to the coast state then a block labeled "CHECK SPEED" in connection with the transition between the coast state and the dynamic brake state. The "CHECK SPEED" box represents a branch in the flow that depends upon whether the rotor spin rate has been reduced below the threshold spin rate $\omega 1$. If so, the next transition proceeds along a line labeled "ALIGN OPERATION" (the controlled rotor-stopping operation) to a first predetermined register state, for example, register state for Phase B. Alternatively, the next transition can proceed to the brake state for a final brake period before proceeding along the line labeled "ALIGN OPERATION" to the first predetermined register state.

When the spin-rate is reduced to the threshold velocity $\omega 1$, the controlled rotor stopping operation is performed such that at the of the controlled-rotor stopping operation the rotor 204 stops at a rotor angle within the range of the peaked forward-direction waveform for the second predetermined register. Controller 220 receives the deceleration/alignment commutation command 231 from microprocessor 230 via parallel bus 298 and generates commutation clock signal 234 having a single pulse for advancing to and maintaining the single register state. Alternatively, microprocessor 230 provides an initialization command via serial interface command 232 to state machine 280 for selecting and maintaining a specific register state. For example, in this alternate embodiment, microprocessor 230 provides an initialization command via interface command 232 to state machine 280 to select the register state for Phase B.

State machine 280 receives commutation clock signal 234 from controller 220 and generates state signal 281 representing the selected register state. Alternatively, state machine 280 receives the initialization command from microprocessor 230 via serial interface command 232 and generates state signal 281 representing the selected register state. Combinatorial logic 282 receives state signal 281 and generates switch control signals 252A in accordance with the conditions defined by the selected register state. The selected register state is maintained for the deceleration/alignment period.

At the end of the deceleration/alignment period (the controlled rotor-stopping operation) microprocessor 230 records in the register 236 a completion signal indicating completion of the deceleration/alignment period. Suitably, microprocessor 230 sets a flag in register 236 indicating completion of the deceleration/alignment period (the controlled rotor-stopping operation).

Figure 5:
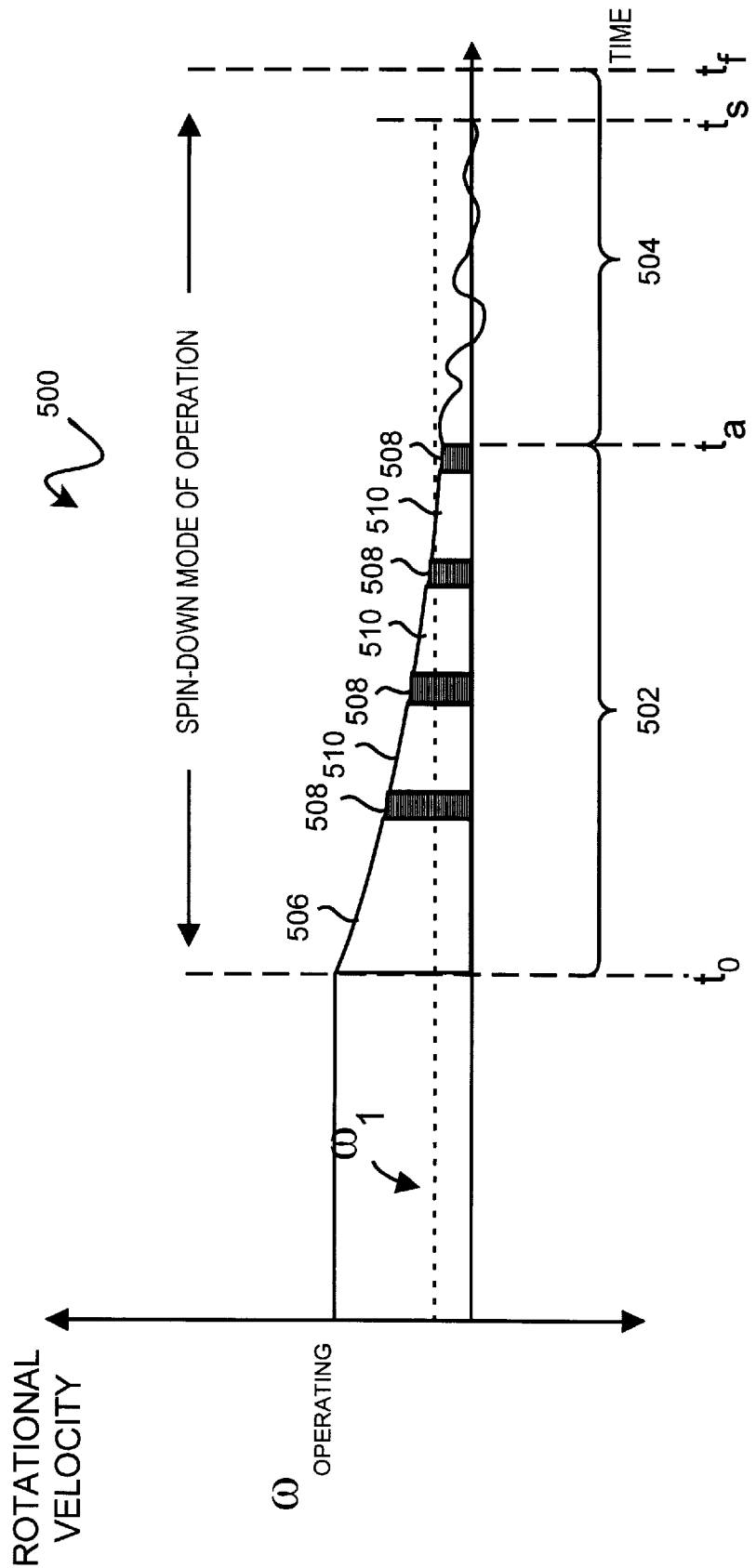
FIG. 5 is a graph showing a velocity curve concerning deceleration of the rotor in response to a spin-down command.

For example, referring to FIG. 5, a velocity curve 500 illustrates the velocity of rotor 204 during the spin-down mode of operation.

The spin-down mode of operation begins at time $t_0$ and ends at time $t_f$. Suitably, the spin-down mode of operation has a deceleration period 502 for reducing the velocity of the spindle motor to a velocity below the threshold velocity $\omega 1$, and a deceleration/alignment period 504 (the controlled rotor-stopping operation) for selecting and maintaining a first predetermined register state while reducing the velocity of rotor 204 to zero, thereby causing the rotor to be aligned with the stator (that is, the rotor stops at a rotor angle within the range of the peaked forward-direction waveform for a second predetermined register state). Alternatively, the spin-down mode of operation has deceleration/alignment period 504 only.

Deceleration period 502 begins when the velocity of rotor 204 is at operating velocity $\omega_{operating}$ at time $t_0$ and ends when the rotor velocity has decreased to below the threshold velocity range $\omega 1$ at time $t_a$. Deceleration/alignment period 504 begins when the velocity has been reduced below the threshold velocity $\omega 1$ at time $t_a$ and ends at time $t_f$.

During deceleration period 502, the controlled braking operation is preferably employed for reducing the spin-rate of the rotor 204 below the threshold velocity $\omega 1$.

Alternatively, the dynamic braking/coasting operation is employed during deceleration period 502 for reducing the spin-rate of the rotor 204 below the threshold velocity ω1. According to this alternate embodiment, microprocessor 230 provides a deceleration-braking 22 command via serial interface command 232 to state machine 280 for selecting the dynamic brake 23 state for shorting the windings A, B, C for a dynamic brake period P1 (506). At the end of dynamic brake period P1 (506), microprocessor 230 provides a deceleration-coast command via serial interface command 232 to state machine 280 for selecting the coast state for floating the windings A, B, C for a coast period P2 (508). While the coast state is selected, microprocessor 230 receives the zero crossing information signal 222 from controller 220 and computes the velocity of spindle motor 220.

If the velocity of the rotor has not been reduced below the threshold velocity ω1, microprocessor 230 provides the deceleration-dynamic brake command via serial interface command 232 to state machine 280 for shorting the windings for a dynamic brake period P3 (510). Preferably, dynamic brake period P3 is shorter than dynamic brake period P1. At the end of dynamic brake period P3, microprocessor 230 provides the deceleration-coast command via serial interface command 232 to state machine 280 for selecting the coast state for the coast period P2. While the coast state is selected, microprocessor 230 receives the zero crossing information signal 222 from controller 220 and computes the velocity of spindle motor 220. Microprocessor 230 repeats the cycle of providing deceleration-shorting command for the dynamic brake period P3 (510) and deceleration-coasting command for the coat period P2 (508) until the velocity of rotor 204 is reduced below the threshold velocity ω1.

When the velocity of spindle motor 220 is reduced below the threshold velocity ω1 at time $t_a$, microprocessor 230 initiates an alignment command to begin deceleration/alignment period 504 (the controlled rotor-stopping operation). Microprocessor 230 provides a deceleration/alignment commutation command 231 via parallel bus 298 to controller 220. For example, the deceleration/alignment commutation command provides timing information for advancing to and maintaining the next register state which is for Phase B. Controller 220 receives the deceleration/alignment commutation command 231 via parallel bus 298 and generates a commutation clock signal 234 having a single pulse 604 for advancing to and maintaining the register state for Phase B. Alternatively, microprocessor 230 provides an initialization command via serial interface command 232 to state machine 280 for selecting and maintaining register state for Phase B during deceleration/alignment period 504.

State machine 280 receives commutation clock signal 234 from controller 220, and generates state signal 281 representing the next register state (which corresponds to Phase B). Alternatively, state machine 280 receives the initialization command from microprocessor 230 via serial interface command 232 and generates state signal 281 representing the next register state. Combinatorial logic 282 receives state signal 281 and generates switch control signals 252A in accordance with the conditions associated with the register state for Phase B.

FIGS. 6A, 6B, 6C, 6D and 6E are all diagrams having a common abscissa representing time during deceleration/alignment period 504 (the controlled rotor-stopping operation). Deceleration/alignment period 504 includes time period A, time period B, time period C, and time period D.

FIGS. 6A–6E illustrate the relationship between the selected register state (FIG. 6A), the electromagnetic torque generated (FIG. 6B), the spin-direction and opposing frictional torque (FIG. 6C), the total energy in the spindle motor (FIG. 6D), and rotational velocity of rotor 204 (FIG. 6E) during time periods A–D.

Referring to FIG. 6A, register state for Phase B is maintained during deceleration/alignment period 504 to cause current to flow through the windings B–A while reducing the velocity of rotor 204 to zero at the end of time period C thereby causing the rotor to be aligned. When so "aligned," the rotor angle is within the range of the peaked forward-direction wave form for a second predetermined register state, for example, the register state for Phase C (FIG. 4A). The register state for phase B remains selected and maintained until the end of time period D (which is the end of deceleration/alignment period 504 at time $t_f$).

Referring to FIG. 6B, torque curve 620 illustrates applied torque ("electromagnetic torque") on the rotor while maintaining the register state for Phase B during time periods A–D (deceleration/alignment period 504). The electromagnetic torque applied on rotor 204 results from the interaction between the stator electromagnetic field with the rotor magnetic field. The electromagnetic torque has a magnitude that varies as a function of the rotor angle.

Referring to FIG. 6C, spin-direction diagram 625 illustrates the forward (FWD) and reverse (REV) spin directions of rotor 204. Frictional torque diagram 627 illustrates the corresponding frictional torque $T_f$ opposing the spin-direction (and the rotational velocity) of rotor 204 during time periods A–D.

Referring to FIG. 6D, energy curve 630 illustrates the energy in the spindle motor during time periods A–D. The spindle motor has electromagnetic potential and kinetic energy that cause it to continue rotating before coming to a stop at the end of time period C. The electromagnetic potential energy is a function of the peak electromagnetic torque, and the angular displacement of rotor 204 relative to the stable equilibrium position (SEP) on the torque curve (such as torque curve T1 of FIG. 4B) corresponding to the selected and maintained register state for Phase B. The kinetic energy depends on the rotational velocity of rotor 204 and the inertia of the spindle motor and the disks supported by the spindle motor. When the rotational velocity of rotor 204 is zero, the kinetic energy is zero. When rotor 204 is at the stable equilibrium position (SEP) on the torque curve, the potential energy is zero.

Referring to FIG. 6E, velocity curve 635 illustrates the rotational velocity of rotor 204 during time periods A–D. Frictional torque in the disk drive reduces the kinetic energy and the rotational velocity of rotor 204.

Referring to FIGS. 6A–6E, during time period A, the electromagnetic torque generated follows a sinusoidal waveform because rotor 204 completely rotates through 360 electrical degrees of a torque curve (such as torque curve T1 of FIG. 4B). Although the frictional torque reduces the peak rotational velocity of rotor 204, rotor 204 continues to rotate in the forward-spin direction due to the kinetic energy remaining in the spindle motor. As the rotational velocity of rotor 204 approaches zero velocity at the end of time period A, the electromagnetic potential energy prevents rotor 204 from coming to a final stop, thereby causing rotor 204 to rotate in the reverse-spin direction at the beginning of time period B. During time period B, the combined torque due to the electromagnetic potential energy and the kinetic energy is greater than the frictional torque. However, rotor 204 no longer rotates through a complete 360 electrical degree cycle of the torque curve corresponding to the selected and maintained register state for Phase B. Rotor 204 begins to traverse (oscillate) about the stable equilibrium point (SEP) of the torque curve, and the rotational velocity alternates between positive (forward-spin direction) and negative (reverse-spin direction) velocities. During time period C, the frictional torque further reduces the peak rotational velocity of rotor 204, thereby reducing the angular displacement of rotor 204 near the stable equilibrium point (SEP) of the torque curve corresponding to the selected and maintained register state for Phase B. At the end of time period C (at time $t_s$), rotor 204 comes to a final stop when the kinetic energy equals zero and the electromagnetic torque generated (due to the electromagnetic potential energy) is less than the frictional torque. Rotor 204 stops at or near the stable equilibrium point (SEP) on the torque curve corresponding to the selected and maintained register state for Phase B. Accordingly, rotor 204 stops at a rotor angle within the range of the peaked forward-direction waveform for a second predetermined register state (such as the register state for Phase C or D).

At the end of deceleration/alignment period 504 at time $t_f$, microprocessor 230 sets a flag in register 236 indicating completion of deceleration/alignment period 504.

If the deceleration/alignment period were completed during the previous spin-down mode of operation, a subsequent spin-up mode of operation commences essentially immediately with a blind acceleration period and a bemf acceleration period for spinning up rotor 204 from rest to an operating velocity.

Figure 1A:
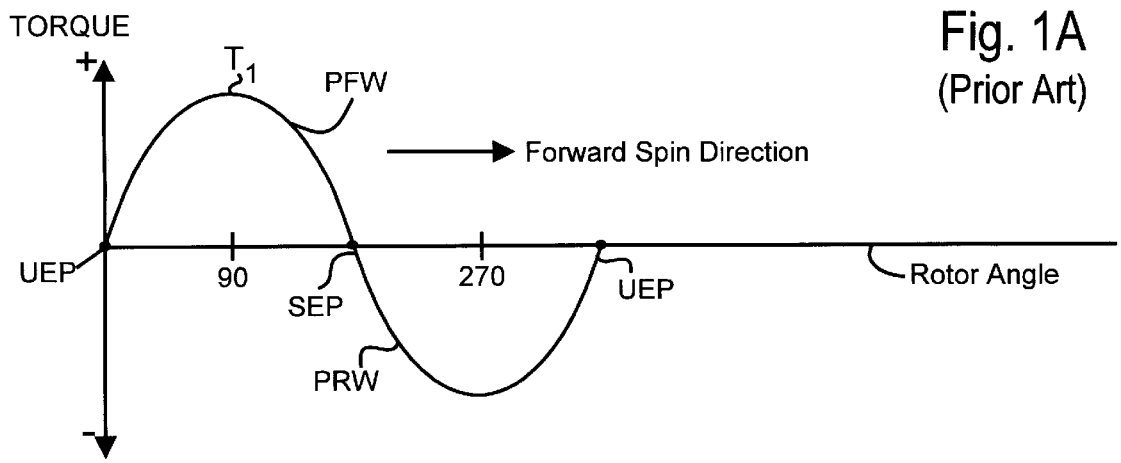
FIG. 1A shows a single electrical cycle of a representative torque curve (T1) which is a graph of applied torque on the rotor of a prior art spindle motor as a function of rotor angle while constant current flows the windings of the stator as determined by a first register state.
Figure 1B:
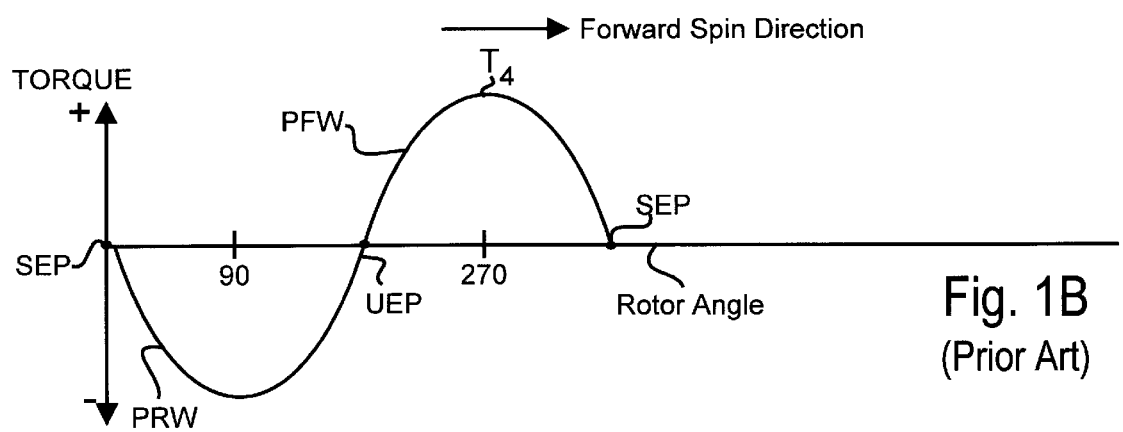
FIG. 1B shows a single electrical cycle of another representative torque curve (T2) for a second register state.
Figure 1C:
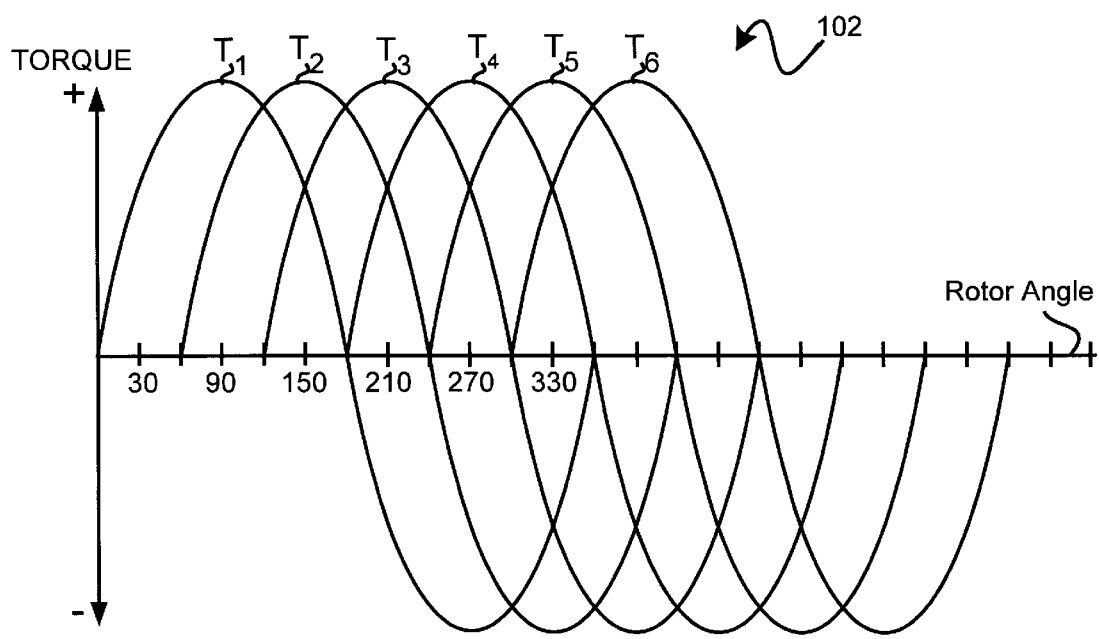
FIG. 1C shows a single electrical cycle of each of multiple torque curves (T1) through (T6) corresponding respectively to six different register states.
Figure 1D:
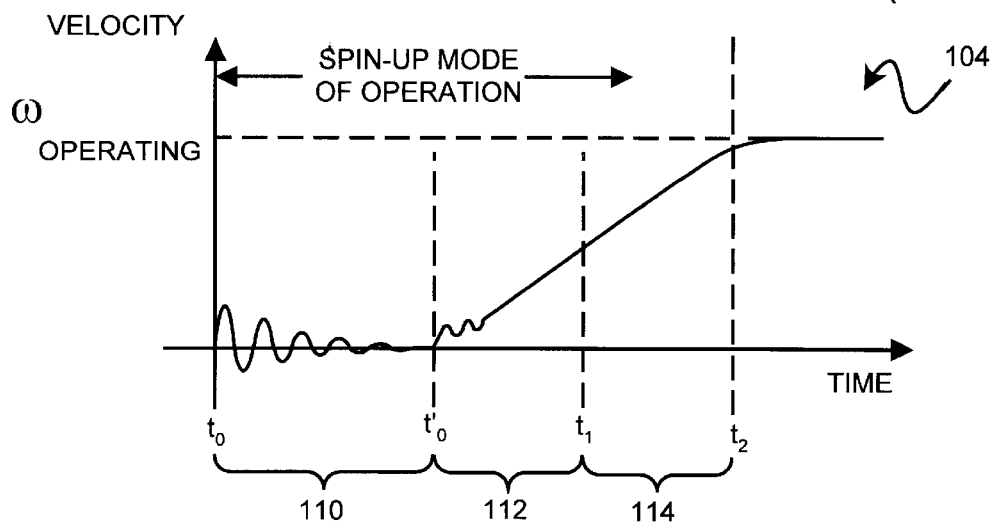
FIG. 1D is a simplified timing diagram showing effect on rotor velocity of the actions taken in sequence during a spin-up procedure in accordance with prior art hereto.
Figure 7:
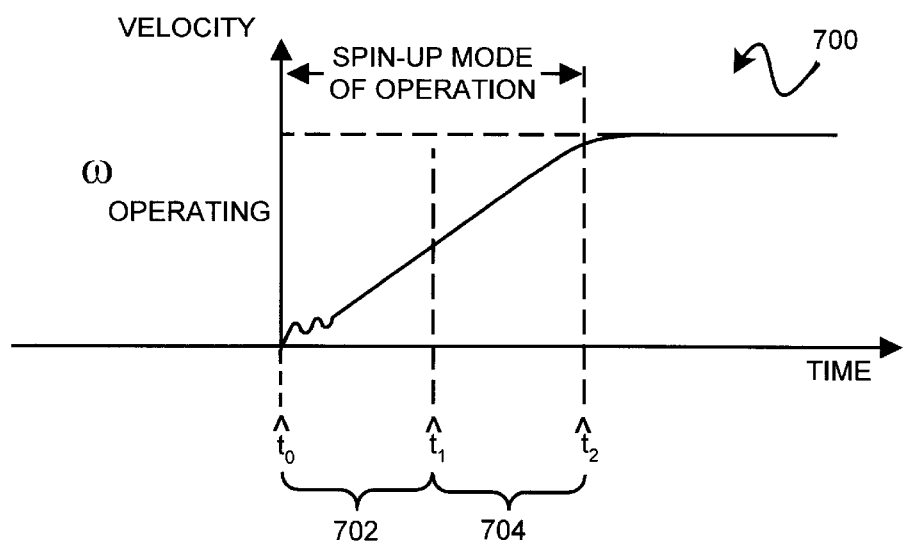
FIG. 7 is a graph showing a velocity curve illustrating the velocity of the rotor during a representative operation of spinning up the rotor to normal operating spin rate.

Referring to FIG. 7, a spin-up velocity curve 700 illustrates the velocity of rotor 204 during the subsequent spin-up mode of operation. The spin-up mode of operation has a blind acceleration period 702 that begins at time $\hat{t}_0$ and ends at time $\hat{t}_1$, and a bemf acceleration period 704 that begins at time $\hat{t}_1$ and ends at time $\hat{t}_2$. Because the rotor was aligned with the stator during deceleration/alignment period (such as period 504 of FIG. 5) of the previous spin-down mode of operation, the subsequent spin-up mode of operation can bypass an alignment period (such as period 110 in prior art FIG. 1D) and immediately proceed to begin blind acceleration period 702, thereby reducing the time for spinning up rotor 204.

However, if the deceleration/alignment period were not completed during the previous spin-down mode of operation, a subsequent spin-up mode of operation has an alignment period for aligning the rotor with the stator before beginning blind acceleration period 702. The alignment period during the spin-up mode of operation increases the time for spinning up rotor 204 from rest to the operating velocity.

Controller 220 receives a command from the host computer to generate the spin-up command 223 while rotor 204 is at rest to begin the spin-up mode of operation. Microprocessor 230 receives spin-up command 223 from controller 220 and retrieves the control routine for the spin-up mode of operation from memory unit 240.

Microprocessor 230 reads register 236 to determine whether a flag had been set during the previous spin-down procedure to indicate successful completion of the controlled rotor stopping operation.

If microprocessor 230 determines that the flag has been set in register 236, microprocessor 230 immediately provides a spin-up commutation command 231 via parallel bus 298 to controller 220. The spin-up commutation command provides timing information for advancing between register states for Phases A–F in a manner to generate a substantially continuous positive torque on the rotor to accelerate rotor 204 from rest to an operating velocity. Suitably, the commutation command provides timing information so that the time between register states decreases as the velocity of rotor 204 increases.

Microprocessor 230 provides a reset command via serial interface command 232 to state machine 280 for resetting state machine 280 to a default register state (such as the register state for Phase B). Microprocessor 230 provides a commutation command to controller 220 for advancing from the default register state to a starting register state (such as the register state for C or D). Preferably, the starting register state is within the next two register states from the register state selected and maintained during the deceleration/alignment period 504 of the spin-down mode of operation. Alternatively, the starting register state can be the same as the register state selected and maintained during the deceleration/alignment period 504 of the spin-down mode of operation.

According to another embodiment, microprocessor 230 provides an initialization command via serial interface command 232 to state machine 280 for initializing state machine 280 to start from the starting register state (such as the register state for Phase B, C or D).

During blind acceleration period 702, controller 220 receives the spin-up commutation command 231 from microprocessor 230 via parallel bus 298 and generates commutation clock signal 234. During bemf acceleration period 704, controller 220 receives zero crossing signal 257 and optimizes the spin-up commutation pattern signal to generate commutation clock signal 234 such that the timing for advancing between register states causes a substantially continuous positive peak torque on the rotor.

State machine 252 receives commutation clock signal 234 from controller 220 and generates state signal 281 representing the selected register state. Combinatorial logic 282 receives state signal 281 and generates switch control signals 252A in accordance with the conditions defined by the selected register state.

Referring to FIG. 8, flow chart 800 sets forth the method of operating rotor 204 described above. At step 802, while rotor 204 is spinning in the forward-spin direction, controller 220 receives a command from the host computer to send spin-down command 221 to microprocessor 230 via parallel bus 298. Microprocessor 230 receives spin-down command 221 from controller 220 and retrieves the spin-down instructions from memory unit 240. Alternatively, microprocessor 230 generates the spin-down command and then retrieves the spin-down instructions from memory unit 240.

At step 804, microprocessor 230 provides VCM control signal 289 to VCM driver 290 for positioning transducers 208A and 208B in a parking zone on disk 206 or alternatively to an unloading position. Suitably, microprocessor 230 waits for a time period which is sufficient for completing step 804 before proceeding to step 806.

At step 806, the controlled braking operation is preferably employed for reducing the velocity of spindle motor 220 below the threshold velocity ω1. Alternatively, the dynamic braking/coasting operation is employed for reducing the velocity of spindle motor 220 below the threshold velocity ω1.

At step 808, when the velocity of spindle motor 220 is reduced below the threshold velocity ω1, microprocessor 230 initiates an alignment command to begin deceleration/alignment period 504. Alternatively, when the velocity of spindle motor 220 is reduced below the threshold velocity ω1, microprocessor 230 provides a deceleration-brake command for selecting the brake state for a final brake period before initiating the alignment command to begin deceleration/alignment period 504.

At step 810, state machine 280 is set and maintained at a first predetermined register state such that a controlled rotor-stopping operation is performed such that at the end of the controlled stopping operation the rotor stops at a rotor angle within the range of the peaked-forward-direction waveform for a second predetermined register state.

At step 812, microprocessor 230 sets a flag in register 236 indicating completion of the controller rotor-stopping operation (deceleration/alignment period 504).

At step 814, microprocessor 230 receives spin-up command 223 and retrieves the spin-up instructions for the spin-up mode of operation from memory unit 240. Microprocessor 230 reads register 236 to determine whether a flag is set to indicate completion of the deceleration/alignment period during the previous spin-down mode of operation.

If the flag is set in register 236, then at step 816, starting from the second predetermined register state, state machine 280 is stepped through a cyclical sequence of register states for Phases A–F to cause current to flow through the windings to accelerate the rotor in the forward-spin direction. Preferably, the second predetermined register state is within the next two register states from the first predetermined register state selected and maintained during the deceleration/alignment period of the spin-down mode of operation. If the flag is not set in register 236, rotor 204 is "cogged" before proceeding to step 816. Suitably, this cogging step can include setting and maintaining (holding) state machine 280 at a first predetermined register state such that at the end of the cogging step the rotor stops at a rotor angle within the range of the peaked-forward-direction waveform for a second predetermined register state.

We claim:

1. A method of operating a spindle motor in a disk drive connectable to a power supply having a fixed DC voltage, the spindle motor including a stator having a plurality of windings and a rotor rotatable at a variable spin-rate, the rotor having an angular position relative to the stator, the disk drive including switching elements coupled to the fixed DC voltage and the plurality of windings, the method comprising the steps of:

controlling the switching elements to sequentially apply the fixed DC voltage across a selected combination of the windings to generate a negative torque on the rotor such that a controlled braking operation is performed to decelerate the rotor to a selected spin-rate ω1; and controlling the switching elements to apply the fixed DC voltage across at least one of the windings after the variable spin-rate is reduced to the selected spin-rate ω1 such that a controlled rotor-stopping operation is performed to control the angular position of the rotor when the rotor comes to a stop at the end of the controlled rotor-stopping operation.

2. The method of claim I further comprising the steps of:
sending a spin-up command after performing the controlled rotor-stopping operation; and
after receiving the spin-up command, controlling the switching elements to sequentially apply the fixed DC voltage across a selected combination of the windings to generate a positive torque on the rotor to accelerate the rotor to an operating spin-rate.

3. The method of claim I further comprising the step of:
after performing the controlled rotor-stopping operation, storing a flag in a register to indicate successful completion of the controlled rotor-stopping operation.

4. A method of operating a spindle motor in a disk drive connectable to a power supply having a fixed DC voltage, the spindle motor including a stator having a plurality of windings and a rotor rotatable at a variable spin-rate in a forward-spin direction, the rotor having an angular position relative to the stator, the disk drive including switching elements coupled to the fixed DC voltage and the plurality of windings, the method comprising the steps of:

sending a spin-down command while the rotor is spinning at the variable spin-rate in the forward spin-direction;

after receiving the spin-down command, and while the rotor continues to spin in the forward spin-direction, controlling the switching elements to sequentially apply the fixed DC voltage across a selected combination of the windings to generate a negative torque on the rotor such that a controlled braking operation is performed to decelerate the rotor to a selected spin-rate ω1;

after the variable spin-rate is reduced to the selected spin-rate ω1, controlling the switching elements to apply the fixed DC voltage across at least one of the windings such that a controlled rotor-stopping operation is performed to control the angular position of the rotor relative to the stator when the rotor comes to a stop at the end of the controlled rotor-stopping operation;

sending a spin-up command after performing the controlled rotor-stopping operation; and after receiving the spin-up command, controlling the switching elements to sequentially apply the fixed DC voltage across a selected combination of the windings to generate a positive torque on the rotor to accelerate the rotor to an operating spin-rate.

5. The method of claim 4 further comprising the step of:
after performing the controlled rotor-stopping operation, storing a flag in a register to indicate successful completion of the controlled rotor-stopping operation.

6. A method of operating a spindle motor in a disk drive, the spindle motor including a stator and a rotor that defines a rotor angle and that is rotatable about the stator desirably in a forward-spin direction and undesirably in a reverse-spin direction, the rotor producing a rotor magnetic field that varies in angular direction as a function of the rotor angle, the stator including a plurality of windings, the drive including a state machine and driver circuitry, the state machine being settable to any one of a plurality of register states including a first predetermined register state and a second predetermined register state, the driver circuitry for causing current to flow selectively through the windings to generate a stator magnetic field having an angular direction that is controlled by the register state set in the state machine, the stator magnetic field interacting with the rotor magnetic field to generate applied torque to act on the rotor, the applied torque for each register state having a magnitude that varies as a periodic function of the rotor angle, the periodic function repeatedly defining in sequence a peaked reverse-direction waveform, a stable equilibrium position, a peaked forward-direction waveform, and an unstable equilibrium position, the method comprising the steps of:

sending a spin-down command while the rotor is spinning in the forward-spin direction;

after receiving the spin-down command, and while the rotor continues to spin in the forward-spin direction, stepping the state machine through a commutation sequence of register states to cause current to flow through the windings such that a controlled braking operation is performed to decelerate the rotor to a selected spin-rate ω1;

after decelerating the rotor to the selected spin-rate ω1, setting the state machine to the first predetermined register state and maintaining the state machine in the first predetermined register state such that a controlled rotor-stopping operation is performed such that at the end of the controlled rotor-stopping operation the rotor stops at a rotor angle within the range of the peaked forward-direction waveform for the second predetermined register state;

sending a spin-up command after performing the controlled rotor-stopping operation; and after receiving the spin-up command, stepping the state machine through a commutation sequence of register states to cause current to flow through the windings to accelerate the rotor to rotate in the forward-spin direction.

7. The method of claim 6 further comprising the step of:

after performing the controlled rotor-stopping operation, storing a flag in a register to indicate successful completion of the controlled rotor-stopping operation.

8. A disk drive comprising:

a head disk assembly including a disk and a spindle motor;

the spindle motor including a stator and a rotor that defines a rotor angle and that is rotatable about the stator desirably in a forward-spin direction and undesirably in a reverse-spin direction, the rotor producing a rotor magnetic field that varies in angular direction as a function of the rotor angle, the stator including a plurality of windings;

a state machine and driver circuitry;

the state machine being settable to any one of a plurality of register states including a first predetermined register state and a second predetermined register state;

the driver circuitry causing current to flow selectively through the windings to generate a stator magnetic field having an angular direction that is controlled by the register state set in the state machine, the stator magnetic field interacting with the rotor magnetic field to generate applied torque to act on the rotor, the applied torque for each register state having a magnitude that varies as a periodic function of the rotor angle, the periodic function repeatedly defining in sequence a peaked reverse-direction waveform, a stable equilibrium position, a peaked forward-direction waveform, and an unstable equilibrium position;

means for sending a spin-down command while the rotor is spinning in the forward-spin direction;

means operative after receiving the spin-down command, and while the rotor continues to spin in the forward-spin direction, for stepping the state machine through a commutation sequence of register states to cause current to flow through the windings such that a controlled braking operation is performed to decelerate the rotor to a selected spin-rate ω1;

means operative after decelerating the rotor to the selected spin-rate ω1 for setting the state machine to the first predetermined register state and maintaining the state machine in the first predetermined register state such that a controlled rotor-stopping operation is performed such that at the end of the controlled rotor-stopping operation the rotor stops at a rotor angle within the range of the peaked forward-direction waveform for the second predetermined register state;

means for sending a spin-up command after performing the controlled rotor-stopping operation; and means operative after receiving the spin-up command, for stepping the state machine through a commutation sequence of register states to cause current to flow through the windings to accelerate the rotor to rotate in the forward-spin direction.

* * * * *